United States Patent Office 3,591,458
Patented July 6, 1971

3,591,458
PROCESS FOR THE DETERMINATION OF NITROGEN-FIXING ACTIVITY
Ralph W. F. Hardy, Unionville, Pa., assignor to E. I. du Pont de Nemours and Company, Wilmington, Del.
No Drawing. Filed Dec. 22, 1967, Ser. No. 692,650
Int. Cl. C12k 1/06
U.S. Cl. 195—103.5          5 Claims

ABSTRACT OF THE DISCLOSURE

Described and claimed is a process for the qualitative or, preferably, quantitative determination of the nitrogen-fixing activity of living organisms by the measurement of their conversion of acetylene to ethylene as determined, for example, by chromatographic analysis.

FIELD OF THE INVENTION

The present invention relates to, and has as its principal object provision of, a process for the determination of the nitrogen-fixing activity of living organisms.

BACKGROUND OF THE INVENTION

The world-wide need and importance of a nitrogen-fixing assay is authoritatively recognized in the January 1967 Program Statement of the Subcommittee on Production Processes, U.S. National Committee for the International Biological Program, of the National Research Council, Division of Biology and Agriculture. This Program Statement recognizes "the clear necessity of matching food production to the needs of the world's population requires an accurate knowledge of the factors limiting production in the various regions and environments of the globe." It also set forth the need for specialized instruments for analytical determination of nitrogen and determination of the distribution of responsible organisms, the potential for nitrogen fixation, etc.

W. D. P. Stewart states in the chapter entitled "Nitrogen Fixation," p. 117 (Nitrogen Fixation in Plants by W. D. P. Stewart, University of London, The Athlone Press, London, 1966) "Measurement of nitrogen fixation under natural conditions. The methods which can be used are dictated by habitat and the nitrogen-fixing organisms being studied. All have technical difficulties and limitations. The following are mainly used: (1) total nitrogen analysis . . . (2) use of the isotope $^{15}$N . . . ."

Thus a rapid, sensitive, universal assay for $N_2$-fixation in the biosphere is required to provide the basis to assess environmental factors which will enhance or extend $N_2$-fixation in the same way that soil analyses are an essential part of fertilizer recommendations.

DESCRIPTION OF THE INVENTION

It has heretofore been noted that non-living cell-free extracts having nitrogen-fixing activity, specifically those from *Clostridium pasteurianum* and *Azotobacter vinelandii* reduce acetylene to ethylene [Dilworth, Biochim. Biophys. Acta 127, 285 (1966), Hardy & Knight, Biochim. Biophys. Acta 139, 69 (1967)]. Non-living cell-free extracts of these organisms have also been found to catalyze other reductions, e.g.

$$N_2O \rightarrow H_2O + N_2$$

[Hardy & Knight, Biochim. Biophys. Res. Com. 23, 409 (1966)]

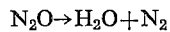
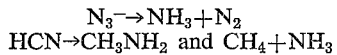

$$N_3^- \rightarrow NH_3 + N_2$$
$$HCN \rightarrow CH_3NH_2 \text{ and } CH_4 + NH_3$$

In accordance with the present invention, it has now been found that living systems that fix nitrogen to ammonia, i.e., $N_2$ to $2NH_3$, also reduce acetylene to ethylene (here sometimes designated by the notation $$[C_2H_2 \rightarrow C_2H_4])$$

and that this reaction can be used to assay the nitrogen fixation either qualitatively or, preferably quantitatively.

Organisms that possess $N_2$-fixing activity include the following classes: (1) free-living bacteria such as *Clostridium pasteurianum* and *Azotobacter Vinelandii*; (2) blue-green algae; and (3) symbionts composed of specific plants infected with specific bacteria such as the symbiosis formed by the soybean infected with *Rhizobium japonicum*. In the case of symbionts, neither the plant nor the infecting bacteria have $N_2$-fixing ability alone, but the symbiont formed by their association has such activity. Surprisingly, members of each of the above three classes also reduce acetylene to ethylene with characteristics that match those of nitrogen reduction.

Significantly, non-$N_2$-fixing bacteria or the non-$N_2$-fixing individual components of symbionts do not reduce acetylene to ethylene. The nitrogen-fixing activity is, in fact, directly related to the acetylene-reducing activity, and under optimum conditions the moles of nitrogen fixed/sample/time are equal to one-third of the moles of ethylene formed/sample/time. The quantitative relationship between the nitrogen-fixing and the acetylene-reducing activity is indicated by the equations:

(1) 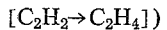
$$N_2 \xrightarrow{6e} 2NH_3; \text{ and}$$

(2)
$$C_2H_2 \xrightarrow{2e} C_2H_4$$

Conditions such as temperature required for reaction (2) are the same as for reaction (1) with variation in the atmosphere, i.e., acetylene in place of nitrogen.

The unexpected discovery that living nitrogen-fixing organisms, and they alone of the living organisms, as far as known, also reduce acetylene to ethylene provides an obvious qualitative test for the presence of such organisms. It is only necessary to put the organisms in contact with, e.g., in, an atmosphere containing acetylene and determine whether some or all of the acetylene is converted to ethylene. The reduction of acetylene to ethylene can, of course, be accomplished by inorganic catalysts not found in the biosphere, but the reaction is difficult to control, complete reduction to ethane being favored, and the conditions such as temperature, pH, etc., required are not ambient.

While qualitative use of the present process is readily accomplished, it is preferably used quantitatively. The mixture of acetylene and ethylene ultimately produced by the living organism can be separated into its components for analysis. Mass spectroscopy and infra-red can be used for analyses but are not sufficiently sensitive for practical utility. However, the use of a flame ionization detector with gas chromatography for the analysis affords a very sensitive and rapid means for determining the ethylene and acetylene present. This can be standardized by comparison with known samples.

The overall technique of the invention consists of incubation of samples of the biosphere, e.g., soil, hydrosphere, and atmosphere containing nitrogen-fixing organisms, in a gas-tight container with acetylene. For determining aerobic nitrogen fixers, oxygen is also present. In the case of anaerobic nitrogen fixers, the absence of oxygen is required. In either case, the incubation proceeds for a selected time and is followed by the separation of ethylene from the other gases with quantitative measurement of the ethylene formed by a sensitive assay such as hydrogen flame ionization detector following gas chromatographic separation [see Dal Nogare et al., Gas-Liquid Chromatography, Interscience, John Wiley & Sons, New York 1962, pages 214–228 and Purnell, Gas Chromatography, John Wiley & Sons, New York, 1962, page 273].

For symbiotic $N_2$-fixers, the root with attached nodules is placed in a gas-tight incubation vessel or soil bore containing root plus attached nodules is placed in such a container. Nodules must remain attached to the root to obtain valid activity.

For free-living $N_2$-fixers, the biosphere sample such as a soil bore or liquid sample is introduced into a gas-tight incubation vessel. Natural or ambient environmental conditions, i.e., native structure of soil and pH, native moisture, native temperature, natural light and $CO_2$ (the latter two especially for a sample containing photosynthetic free-living $N_2$-fixers), should be maintained during complete assay in order to obtain $N_2$-fixing activity substantially equivalent to that obtained in situ. Alternatively, standardized conditions of temperature, e.g., 10–35° C. with 18–30° C. preferred, moisture and light may be used for a determination of a standardized $N_2$-fixing ability.

Disposable syringes, 50 ml. or larger, are a good incubation vessel since they permit (1) removal of air by flushing, (2) addition and mixing of incubation gas, (3) and removal and mixing of the product gas. Liquid samples of 30 ml. or soil bores of 1″ x 3″ are suitable sample sizes for such syringes.

The incubation for determination of $N_2$-fixing activity via $[C_2H_2 \rightarrow C_2H_4]$ reduction should proceed immediately after transfer of sample from its native environment to incubation container in order to obtain a valid estimate of the in situ $N_2$-fixing activity. Significant activity decreases have been observed when samples are assayed two to three hours after removal from native environment.

The sample is flushed repeatedly (generally 3 times) to remove atmospheric $N_2$ and/or $O_2$ with successive mixtures of an inert gas and $O_2$, e.g., argon/oxygen in a ratio of 0.8/0.2 for aerobic fixation or an inert gas alone for anaerobic fixation. For a 50 ml. container of the sample, 20 ml. of the gas is generally used for each flushing. Finally, acetylene is introduced. For an equivalent charge of 1 atm. of inert gas/$O_2$ (0.8/0.2), mixed with 0.02–0.5 atm. of acetylene (0.05–0.2 atm. is optimal to saturate the enzyme; higher concentrations than about 50% acetylene may inhibit) is introduced for aerobic fixers (or inert gas without $O_2$ but containing acetylene for anaerobic fixers), after flushing and adding more gas mixture, the sample is incubated with this gas phase for a predetermined time such as one hour.

After the predetermined time has elapsed, the gas phase is removed, mixed thoroughly and stored in a gas-tight container for quantitative determination of $C_2H_4$ and $C_2H_2$ as by hydrogen flame ionization detection after gas chromatography. Separation of $C_2H_4$ from $C_2H_2$ can be obtained, for example, by a 10′ x ⅛″ column containing 20% ethyl-N,N′-dimethyl oxalamide on 100–120 mesh acid-washed firebrick at 0° C. with a flow rate of 30 cc./minute. Results are obtained directly from a chromatographic analyzer showing the $C_2H_4$ or $C_2H_2$ content. Less than $10^{-12}$ moles of $C_2H_4$/injected sample can be detected and 0.2 ml. of gas-phase is an appropriate sample size. As is evident to those skilled in chromatography, the $[C_2H_2 \rightarrow C_2H_4]$ is readily calculated. Ethylene found in product gas can be corrected for any contaminating $C_2H_4$ in $C_2H_2$. The correction for $C_2H_4$ formed in the absence of $C_2H_2$ can be determined in a separate incubation but it has been insignificant in all field tests. To convert μmoles of $[C_2H_2 \rightarrow C_2H_4]$/sample/hour is equivalent to a $N_2$-fixing activity of ⅓ μmole $N_2$-fixed/sample/hour.

Several points may be noted concerning the present $[C_2H_2 \rightarrow C_2H_4]$ assay for $N_2$-fixing activity:

(1) The present process is highly sensitive. Less than 1 μμmole of $C_2H_4$ can be detected by the preferred gas chromatographic analysis. This is at least 1000 times more sensitive than mass spectrometric [$^{15}$N] determination, the most sensitive method known heretofore, and more than $10^6$ times more sensitive than Kjeldahl analysis. $N_2$-fixing activity of as few as 10,000 bacteria cells or .003 ml. of a growing culture is detected with the

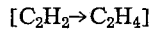

assay.

(2) The process is rapid, rates of 10 samples/man hour having been obtained in the field. This rate compares favorably with other biosphere analyses.

(3) The process requires no chemical manipulation of the product prior to the assay. Product ethylene is assayed directly, while methods such as $^{15}$N mass spectrometry require digestion, distillation, re-oxidation, etc., before assay.

(4) The process exhibits a low background for analysis since negligible $C_2H_4$ is formed in the absence of $C_2H_2$. Nitrogen analyses such as mass spectrometry involve a species with a substantial background.

(5) The process employs inexpensive equipment. Gas chromatographic equipment is inexpensive relative to mass spectrometric equipment and can be automated for large-scale analysis.

(6) The process is versatile, functioning with the different classes of $N_2$-fixers including legumes, non-legumes, blue-green algae and bacteria in pure culture or in the biosphere.

EMBODIMENTS OF THE INVENTION

There follow some nonlimiting examples which are descriptive of several embodiments of the invention.

Example 1.—$N_2$-fixing activity of bacteria (A) A sample of a pure laboratory culture containing $85 \times 10^6$ cells of the aerobic $N_2$-fixing bacteria, *Azotobacter vinelandii* grown on nitrogen-free media [Mumford, F. E., Carnahan, J. E., and Castle, J. E., J. Bacterial. 77, 86 (1959)], and air was transferred to a syringe and diluted to a total volume of 4.0 ml. with nitrogen-free media. The sample was flushed three times with argon/oxygen (0.8/0.2) and was subsequently flushed with an atmosphere of argon/oxygen (0.8/0.2) containing 10% acetylene. A second addition of 20 ml. of the atmosphere of argon and oxygen containing 10% acetylene was left in the syringe and incubated for 24 hours at 30° C.

The rate of $[C_2H_2 \rightarrow C_2H_4]$ reduction was found to be constant up to 17.5 hours with 1.3 μmoles $C_2H_2$ reduced to $C_2H_4$ per hour at 30° C. The reduction $[C_2H_2 \rightarrow C_2H_4]$ was directly related to cell number over a 10,000 range and $[C_2H_2 \rightarrow C_2H_4]$ reducing activity could be detected with less than 10,000 cells.

No reduction products of acetylene other than ethylene have been detected.

(B) A similar sample containing $85 \times 10^6$ cells was treated in a manner similar to that of (A), but in the absence of $C_2H_2$ formed negligible $C_2H_4$ (<0.004% of that in the presence of $C_2H_2$).

(C) In another experiment, a similar sample of the culture used above was flushed and left with a nitrogen/oxygen mixture fixed 0.4 μmole of $N_2$/hour at 30° C. A pure culture of *A. vinelandii* grown on a media containing fixed nitrogen, e.g., $NH_4^+$ reduced neither

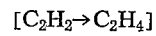

nor fixed nitrogen.

(D) Results similar to those above were obtained for a sample of a laboratory culture of an anaerobic $N_2$-fixing bacteria *Clostridium pasteurianum*, anaerobic conditions required.

(E) Samples of soybean roots without nodules or of soybean roots with nodules that were not pink did not reduce $[C_2H_2 \rightarrow C_2H_4]$ nor do they fix nitrogen. Pure laboratory cultures of various Rhizobia such as *Rhizobium japonicum* do not reduce $[C_2H_2 \rightarrow C_2H_4]$ nor do they fix nitrogen.

Example 2.—Free-living $N_2$-fixing activity of soil (A) Samples were taken from (Jordan) soil plats at Pennsylvania State University on which record had been kept of selected treatments for at least 85 years. In each instance, a cylindrical soil sample, 1″ x 3″ was taken from either the 0–3″ or 3–6″ soil level and immediately placed in a 1″ inside diameter syringe tube in such a manner that the sample was essentially undisturbed. The open end of a syringe (50 ml.) was closed with a plunger and the soil sample flushed three times in a stream of argon/oxygen (0.8/0.2) to remove nitrogen from its atmosphere. The argon/oxygen-containing tube was flushed with an atmosphere of argon and oxygen containing 10% acetylene. A second addition of 20 ml. of the same atmosphere was left in the syringe and incubated for 1 hour at the ambient temperature of the soil (18° C.). During the incubation, the syringe was plugged with a stopper to prevent gas loss.

At the end of the incubation period, the gas sample was forced into a receiver from which aliquots of 0.2 ml. were taken for $C_2H_4$ and $C_2H_2$ analysis. $H_2$-flame ionization detection following gas chromatography was used. Some of the results are tabulated below:

| Plot treatment: | Calculated kg. of $N_2$ fixed for 0–6″ deep acre/day |
|---|---|
| K only added | 1.52 |
| P only added | 1.12 |
| No N, P, K added | 1.10 |
| P and K added | 1.02 |
| N and P added | 0.95 |
| N and K | 0.75 |
| N, P and K added | 0.73 |
| With recommended additions: | |
| I | 0.59 |
| II | 0.54 |
| III | 0.53 |
| P and K and 3 times the recommended N added | 0.16 |

It is noted that (1) the three plots receiving normally recommended fertilizer treatment are similar, (2) excess nitrogen decreases $N_2$-fixing activity and (3) a deficiency of nitrogen increases $N_2$-fixing activity. In the above example, 28 plots with 6 samples per plot were assayed in the field by 3 workers in 5½ hours. Free-living $N_2$-fixation is thus shown to be more significant than probably previously realized (see Stewart, op. cit. p. 117).

(B) Other samples of free-living $N_2$-fixing activity assayed by [$C_2H_2 \rightarrow C_2H_4$] conversion include aerobic and anaerobic activity of different soil types at different depths. Thus, in one case a sandy soil under anaerobic conditions fixed 0.045 kg. $N_2$/day/acre for 0–3″ soil depth while 0.21 kg. $N_2$ was fixed/day/acre for 6–9″ soil depth.

Example 3.—Symbiont $N_2$-fixing activity (A) The [$C_2H_2 \rightarrow C_2H_4$] activity of a symbiont, nodulated soybeans grown under field conditions, was determined every two or three days during the growing period for a total of over a thousand individual assays. In some cases, assays were made during various times of the night or day to determine effect of photosynthesis on $N_2$-fixation.

Soybean plants were removed from the soil so as not to detach any of the nodules. The portion of the root containing nodules was cut from the rest of the plant and placed with the attached nodules in a 1″-inside diameter syringe tube. The open end was closed with a plunger and flushed, gassed and incubated as in Example 1. At the end of the incubation period, gas was transferred and analyzed as in Example 1. Ethylene as moles/day/plant is converted to $N_2$-fixed as moles/day/plant as follows:

$$\frac{(\text{moles } C_2H_4/\text{day}/\text{plant})}{3}$$

and multiplying this result by 28 (M.W. of $N_2$) and number of plants/acre to give $N_2$-fixed in grams/day/acre. A few of the results are presented below, each representing averages of 5 individual plants.

| Soybean plants: | Calculated kg. $N_2$ fixed/acre/day |
|---|---|
| Pre-flowering | <.06 |
| 4 days post-flowering | .27 |
| 16 days post-flowering | .48 |
| 23 days post-flowering | .75 |
| 29 days post-flowering | .80 |
| 37 days post-flowering | 1.26 |
| 43 days post-flowering | 0.74 |
| 48 days post-flowering | 0.35 |
| 55 days post-flowering | 0.00 |

Summation of $N_2$-fixed (calculated on the acetylene conversion to ethylene vs. days) indicates 33 kg. or 73 lb. of $N_2$ fixed/acre/season. The similarity to the average reported values, 84 lbs./acre/season, using $^{15}N$ or Kjeldahl analysis (p. 120 in "Nitrogen Fixation in Plants," by W. D. P. Stewart, The Athlone Press, London, 1966) indicates the validity of the [$C_2H_2 \rightarrow C_2H_4$] assay as a measure of nitrogen fixation. Assay of root plus attached nodules is preferred for symbionts such as this example where the distribution of $N_2$-fixing activity is not uniform throughout the soil.

(B) Oxygen is required by these symbionts for nitrogen-fixing activity. In the absence of oxygen, the nitrogen-fixing activity as measured by acetylene reduction is less than 3% of that when it is present. Negligible ethylene is formed in the absence of acetylene.

(C) Additional tests were run on other symbionts including beans, alfalfa, clover and different varieties of soybeans. Fixation by alfalfa was found to be 0.47 kg. of $N_2$ fixed/acre/day.

Example 4.—Blue-green algae in pond

Samples of pond water containing blue-green algae were assayed for [$C_2H_2 \rightarrow C_2H_4$] activity and $N_2$-fixing activity was calculated. Samples (25.0 ml.) of pond algae were immediately placed in syringes as in Example 1 or 2 and were flushed, gassed and incubated, and the resultant gas phase assayed. Controls were incubated as above but without acetylene, in which ethylene formation by the sample in the absence of acetylene being <1% of that in the presence of acetylene. $N_2$-fixing activity was found to be 46 m$\mu$ g. $N_2$ fixed/day/ml. of pond water.

Samples of pond water without blue-green algae did not reduce acetylene to ethylene.

Example 5.—Free-living $N_2$-fixing activity of rumen contents

Samples of rumen contents were taken from a fistulated bovine animal and assayed for [$C_2H_2 \rightarrow C_2H_4$] activity and $N_2$-fixing activity was calculated. Samples (5.0 ml.) of rumen contents were immediately placed in a syringe as in the preceding examples and were flushed, gassed and incubated, except that gas phase was anaerobic for one-half of the samples and aerobic for the other half. Results are tabulated below:

| Gas phase | $C_2H_4$, m$\mu$ moles/sample/day | $N_2$ fixed, m$\mu$ g./sample/day |
|---|---|---|
| He/$C_2H_2$ | 146 | 1,360 |
| A/$O_2$/$C_2H_2$ | 12.7 | 118 |

The amount of $N_2$-fixing activity in a rumen is 10.4 mg. $N_2$ fixed/10 gal. rumen/day. This example demonstrates that the present assay can find $N_2$-fixing activity that could not previously be detected.

Since obvious modifications and equivalents in the invention will be evident to those skilled in the chemical arts, I propose to be bound solely by the appended claims.

The embodiments of the invention in which an exclusive property or privilege is claimed are defined as follows:

1. The process of determining the nitrogen-fixing capacity of a living biological system which consists essentially in the steps of:
   (a) selecting a fresh sample containing living nitrogen-fixing organisms selected from the group consisting of nitrogen-fixing symbionts and photosynthetic nitrogen-fixing blue-green algae;
   (b) maintaining said fresh sample for a predetermined incubation period of time in the presence of an atmosphere consisting essentially of an inert gas and about 0.02 to about 0.5 atmosphere of acetylene, said atmosphere also containing oxygen when the organisms are aerobic, and containing carbon dioxide when the organisms are photosynthetic; and
   (c) determining the presence and amount of ethylene produced by the organisms after the expiration of said predetermined incubation period of time.

2. The process of claim 1 wherein the sample selected contains nitrogen-fixing symbionts and the atmosphere contains oxygen.

3. The process of claim 1 wherein the sample selected contains photosynthetic nitrogen-fixing blue-green aglae.

4. The process of claim 2 wherein the ethylene is determined by flame ionization detection following gas chromatographic separation.

5. The process of claim 3 wherein the ethylene is determined by flame ionization detection following gas chromatographic separation.

References Cited

UNITED STATES PATENTS

| | | | |
|---|---|---|---|
| 3,119,749 | 1/1964 | Thoma et al. | 195—51 |
| 3,451,893 | 6/1969 | Sanders | 195—103.5 |
| 3,393,063 | 7/1968 | Coty | 195—50X |
| 3,401,180 | 9/1968 | Pan et al. | 195—51X |

OTHER REFERENCES

Dilworth:, "Biochim. Biophys. Acta" 172: 285–294 (1966).

Hardy and Knight: "Biochim. Biophys. Acta" 139: 69–90 (1967).

ALVIN E. TANENHOLTZ, Primary Examiner

M. D. HENSLEY, Assistant Examiner

U.S. Cl. X.R.

47—1.4; 195—50